(12) United States Patent
Du et al.

(10) Patent No.: US 11,372,444 B2
(45) Date of Patent: Jun. 28, 2022

(54) IN-VEHICLE INFOTAINMENT APPARATUS, TERMINAL DEVICE, AND VEHICLE

(71) Applicant: HUAWEI TECHNOLOGIES CO., LTD., Shenzhen (CN)

(72) Inventors: Gaofeng Du, Xi'an (CN); Yongzhe Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 16/603,656

(22) PCT Filed: Jul. 13, 2017

(86) PCT No.: PCT/CN2017/092789
§ 371 (c)(1),
(2) Date: Oct. 8, 2019

(87) PCT Pub. No.: WO2018/188221
PCT Pub. Date: Oct. 18, 2018

(65) Prior Publication Data
US 2020/0117232 A1 Apr. 16, 2020

(30) Foreign Application Priority Data
Apr. 9, 2017 (CN) .......................... 201710226454.4

(51) Int. Cl.
*G06F 1/16* (2006.01)
*B60K 35/00* (2006.01)
*B60R 16/023* (2006.01)

(52) U.S. Cl.
CPC ............ *G06F 1/1605* (2013.01); *B60K 35/00* (2013.01); *B60R 16/0232* (2013.01);
(Continued)

(58) Field of Classification Search
CPC . G06F 1/1605; B60K 35/00; B60K 2370/152; B60K 2370/197;
(Continued)

(56) References Cited

U.S. PATENT DOCUMENTS

2007/0164609 A1 7/2007 Shalam et al.
2011/0281562 A1* 11/2011 Videtich ................. H04W 4/48
455/414.1

(Continued)

FOREIGN PATENT DOCUMENTS

CN 102006589 A 4/2011
CN 202463722 U 10/2012
(Continued)

*Primary Examiner* — Richard M Camby
(74) *Attorney, Agent, or Firm* — Maier & Maier, PLLC (57) ABSTRACT

An in-vehicle infotainment IVI apparatus, a terminal device, and a vehicle are provided. The IVI apparatus includes a management module. The management module is configured to: obtain component information of each of at least one IVI component, where the component information includes an internet protocol address; and send the component information of each component to the terminal device, so that the terminal device communicates with the at least one IVI component based on the information about each IVI component. According to the IVI apparatus, the terminal device, and the vehicle, the IVI component can be controlled by using the terminal device.

14 Claims, 2 Drawing Sheets

(52) U.S. Cl.
CPC .. *B60K 2370/152* (2019.05); *B60K 2370/197* (2019.05); *B60K 2370/52* (2019.05)

(58) Field of Classification Search
CPC . B60K 2370/52; B60R 16/0232; B60R 11/00; H04M 11/085; H04W 4/80; H04W 4/48; G08G 1/0967; H04B 1/3822
See application file for complete search history.

(56) References Cited

U.S. PATENT DOCUMENTS

| | | | | |
|---|---|---|---|---|
| 2011/0294466 | A1* | 12/2011 | Tang | H04W 4/44 455/411 |
| 2012/0110356 | A1* | 5/2012 | Yousefi | B60L 50/00 713/320 |
| 2013/0086518 | A1* | 4/2013 | Park | H04W 4/20 715/808 |
| 2013/0203400 | A1* | 8/2013 | Ricci | G06F 3/04817 455/418 |
| 2013/0204943 | A1* | 8/2013 | Ricci | G08G 1/096791 709/204 |

FOREIGN PATENT DOCUMENTS

| | | |
|---|---|---|
| CN | 203057252 U | 7/2013 |
| CN | 203103042 U | 7/2013 |
| CN | 104065825 A | 9/2014 |
| CN | 104092020 A | 10/2014 |
| CN | 203859567 U | 10/2014 |
| CN | 104392622 A | 3/2015 |
| CN | 104735125 A | 6/2015 |
| CN | 104808608 A | 7/2015 |
| CN | 105071553 A | 11/2015 |
| CN | 204928898 U | 12/2015 |
| CN | 105228146 A | 1/2016 |
| CN | 105278973 A | 1/2016 |
| CN | 204978457 U | 1/2016 |
| CN | 105337332 A | 2/2016 |
| CN | 105383404 A | 3/2016 |
| CN | 103199333 B | 4/2016 |
| CN | 205131125 U | 4/2016 |
| CN | 205212454 U | 5/2016 |
| CN | 205405634 U | 7/2016 |
| CN | 105898890 A | 8/2016 |
| CN | 106476729 A | 3/2017 |
| EP | 3057375 A1 | 8/2016 |
| GB | 2529760 A | 3/2016 |
| WO | 2005004431 A2 | 1/2005 |

\* cited by examiner

IN-VEHICLE INFOTAINMENT APPARATUS, TERMINAL DEVICE, AND VEHICLE

CROSS-REFERENCE TO RELATED APPLICATIONS

This application is a national stage of International Application No. PCT/CN2017/092789, filed on Jul. 13, 2017, which claims priority to Chinese Patent Application No. 201710226454.4, filed on Apr. 9, 2017. Both of the aforementioned applications are hereby incorporated by reference in their entireties.

FIELD

This application relates to the in-vehicle infotainment (IVI) service field, and more specifically, to an in-vehicle infotainment apparatus, a terminal device, and a vehicle in the in-vehicle infotainment service field.

BACKGROUND

With continuous development of IVI service technologies, requirements of a user for driving experience, especially for entertainment experience, during vehicle driving constantly increase, and an IVI system needs to provide rich entertainment experience for the user.

An existing IVI system of a vehicle is built into a body of the vehicle. In such situations, a user controls hardware in the vehicle by using an in-vehicle computer, to enjoy IVI services (for example, navigation and media resource playing services). Although some in-vehicle computers support terminal device linkage, only simple multimedia playing and voice conversation can be performed by using a terminal device.

Therefore, an application program installed on an existing in-vehicle computer, an invocation relationship between the application program and a hardware device in the vehicle, and the like are all built into the IVI system, and consequently flexibility is relatively poor.

SUMMARY

Exemplary embodiments provide an in-vehicle infotainment (IVI) apparatus, a terminal device, and a vehicle, to control an IVI component by using the terminal device, thereby improving IVI service flexibility.

According to a first aspect, this application provides an IVI apparatus, the IVI apparatus includes a management module, and the management module is configured to:

obtain component information of each of at least one IVI component, where the component information includes a network address; and send the component information of each component to the terminal device, so that the terminal device communicates with the at least one IVI component based on the information about each IVI component.

According to the IVI apparatus provided in this embodiment, the IVI apparatus includes the management module, and the management module can obtain the component information of each of the at least one IVI component, and send the component information of each component to the terminal device, so that the terminal device can communicate with each IVI component based on the component information of each IVI component. In other words, a user can control an IVI component by using a terminal device of the user, thereby reducing a degree of coupling between an IVI component and an application program in an IVI system, and improving flexibility of IVI system expansion and upgrade.

In addition, because most protocol standards of the IVI apparatus are open standards, an application developer and an IVI component vendor may perform free adaptation, and openness is relatively strong.

In a possible implementation, the management module is configured to: before obtaining the component information of each of the at least one IVI component, receive a service request sent by the terminal device, where the service request is used to request to provide a service for an application module of the terminal device; and determine, in all IVI components based on the service request, the at least one IVI component that has an association relationship with the application module.

It can be understood that the IVI component that has an association relationship with the application module may be an IVI component that can be invoked by the application module.

In a possible implementation, the IVI apparatus further includes a connection module, and the connection module includes an induction coil. The induction coil is configured to establish a connection between the terminal device and a first network before the management module sends the component information of each component to the terminal device, where each IVI component is connected to the first network.

It can be understood that the induction coil may establish the connection between the terminal device and the first network through NFC communication.

Optionally, the connection module may alternatively include a connection contact, and the connection contact is configured to establish a connection between the terminal device and a first network before the management module sends the component information of each component to the terminal device.

According to the IVI apparatus provided in this embodiment, when a physical connection between the terminal device and the connection module is established, the connection module may establish the connection between the terminal device and the first network; or when a physical connection between the terminal device and the connection module is disconnected, the terminal device may be disconnected from the first network. In this way, an operation is convenient, and user experience is relatively good.

In a possible implementation, the induction coil is further configured to charge the terminal device.

Optionally, the connection module may alternatively include a connection contact, and the connection contact is configured to charge the terminal device.

According to the IVI apparatus provided in this embodiment, in a driving process, the connection module may charge the terminal device based on usage of the user, to improve an endurance capability of the terminal device, thereby improving user experience.

In a possible implementation, the IVI apparatus further includes a battery management module, and the battery management module is configured to: obtain battery usage of the terminal device before the terminal device is charged; and determine, based on the battery usage, that the terminal device needs to be charged.

Optionally, the battery management module may further determine a charging manner and charging intensity of the terminal device. The charging manner may be wireless charging (connection contact charging/induction charging) or wired charging. This embodiment imposes no limitation thereto.

Optionally, the connection module may charge the terminal device based on the charging manner and the charging intensity.

In a possible implementation, the connection module further includes a heat dissipation component, and the heat dissipation component is configured to dissipate heat for the terminal device.

Optionally, the heat dissipation component may include a cooling fan, a refrigerator, and the like. This embodiment imposes no limitation thereto.

In a possible implementation, the IVI apparatus further includes a temperature management module, and the temperature management module is configured to: obtain an operating status of the terminal device before heat is dissipated for the terminal device, where the operating status includes a temperature; and determine, based on the operating status, that heat needs to be dissipated for the terminal device.

Optionally, the operating status may alternatively include a temperature, humidity, a dew point, heat dissipation intensity, and the like. This embodiment imposes no limitation thereto.

According to the IVI apparatus provided in this embodiment, in a driving process, the connection module may dissipate heat for the terminal device based on an operating temperature of the terminal device, to avoid a case in which use performance and security performance are affected because the temperature of the terminal device is excessively high due to long-time use or sun exposure, thereby improving user experience.

In a possible implementation, the IVI apparatus further includes a network module, and the network module is configured to provide the first network for the terminal device and each IVI component before the management module obtains the component information of each IVI component.

Optionally, the first network may be a wired network or a wireless network. This embodiment imposes no limitation thereto.

For example, the network module may be a switch.

In a possible implementation, the IVI apparatus further includes a storage module, and the storage module is configured to store the component information of each IVI component.

Optionally, the storage module may be a memory.

In a possible implementation, the component information further includes at least one of a deployment location, a supported protocol, a protocol version, hardware information, and security information.

Optionally, the component information may include the network address and other information. The other information may include at least one of a deployment location, a supported protocol (for example, the simple network management protocol (SNMP), the digital living network alliance (DLNA), or the real-time streaming protocol (RTSP)), a protocol version, hardware information (for example, a device model, a hardware version, or a firmware version), and security information (for example, a permission level, a permission matrix, or a supported encryption manner). This embodiment imposes no limitation thereto.

According to a second aspect, a terminal device is provided, and the terminal device includes a transceiver module and a communications module.

The transceiver module is configured to receive component information that is of each of at least one IVI component and that is sent by a management module of an in-vehicle infotainment IVI apparatus, where the component information includes a network address.

The communications module is configured to communicate with the at least one IVI component based on the component information of each IVI component.

In a possible implementation, the transceiver module is configured to: send a service request to the management module before receiving the component information that is of each of the at least one IVI component and that is sent by the management module of the IVI apparatus, where the service request is used to request to provide a service for an application module of the terminal device; and receive the component information that is of each IVI component and that is sent by the management module based on the service request.

In a possible implementation, the terminal device further includes a connection establishment module, and the connection establishment module is configured to: before the transceiver module sends the service request to the management module, establish a connection between the terminal device and a first network by using a connection module of the IVI apparatus, where each IVI component is connected to the first network.

In a possible implementation, the terminal device further includes a battery module; and the battery module is configured to: supply power to the terminal device, and perform charging by using the connection module of the IVI apparatus.

In a possible implementation, the communications module is configured to communicate with some or all of the at least one IVI component based on the component information of each IVI component.

In a possible implementation, the component information further includes at least one of a deployment location, a supported protocol, a protocol version, hardware information, and security information.

According to a third aspect, this application provides a vehicle, and the vehicle includes the IVI apparatus provided in the first aspect or various possible implementations of the first aspect.

According to a fourth aspect, this application provides a communication method, and the communication method includes:

obtaining component information of each of at least one IVI component, where the component information includes a network address; and sending the component information of each component to the terminal device, so that the terminal device communicates with the at least one IVI component based on the information about each IVI component.

In a possible implementation, before the obtaining component information of each of at least one IVI component, the communication method further includes: receiving a service request sent by the terminal device, where the service request is used to request to provide a service for an application module of the terminal device; and determining, in all IVI components based on the service request, the at least one IVI component that has an association relationship with the application module.

In a possible implementation, before the sending the component information of each component to the terminal device, the communication method further includes: establishing a connection between the terminal device and a first network, where each IVI component is connected to the first network.

In a possible implementation, the communication method further includes: controlling an induction coil to charge the terminal device.

In a possible implementation, before the controlling an induction coil to charge the terminal device, the communication method further includes: obtaining battery usage of the terminal device; and determining, based on the battery usage, that the terminal device needs to be charged.

In a possible implementation, the communication method further includes: controlling a heat dissipation component to dissipate heat for the terminal device.

In a possible implementation, before the dissipating heat for the terminal device, the communication method further includes: obtaining an operating status of the terminal device, where the operating status includes a temperature; and determining, based on the operating status, that heat needs to be dissipated for the terminal device.

In a possible implementation, before the obtaining component information of each IVI component, the first network is provided for the terminal device and each IVI component.

In a possible implementation, before the sending the component information of each component to the terminal device, the communication method further includes: storing the component information of each IVI component.

In a possible implementation, the component information further includes at least one of a deployment location, a supported protocol, a protocol version, hardware information, and security information.

According to a fifth aspect, this application provides another communication method, and the communication method includes:

receiving component information that is of each of at least one IVI component and that is sent by an in-vehicle infotainment IVI apparatus, where the component information includes a network address; and communicating with the at least one IVI component based on the component information of each IVI component.

In a possible implementation, before the receiving component information that is of each of at least one IVI component and that is sent by an IVI apparatus, the communication method further includes: sending a service request to the IVI apparatus, where the service request is used to request to provide a service for an application module of the terminal device; and receiving the component information that is of each WI component and that is sent by the IVI apparatus based on the service request.

In a possible implementation, before the sending a service request to the IVI apparatus, the communication method further includes: establishing a connection between the terminal device and a first network by using the IVI apparatus, where each IVI component is connected to the first network.

In a possible implementation, the communicating with the at least one IVI component based on the component information of each IVI component includes: communicating with some or all of the at least one IVI component based on the component information of each IVI component.

In a possible implementation, the component information further includes at least one of a deployment location, a supported protocol, a protocol version, hardware information, and security information.

DESCRIPTION OF EMBODIMENTS

The following describes the technical solutions of the exemplary embodiments with reference to the accompanying drawings.

Figure 1:
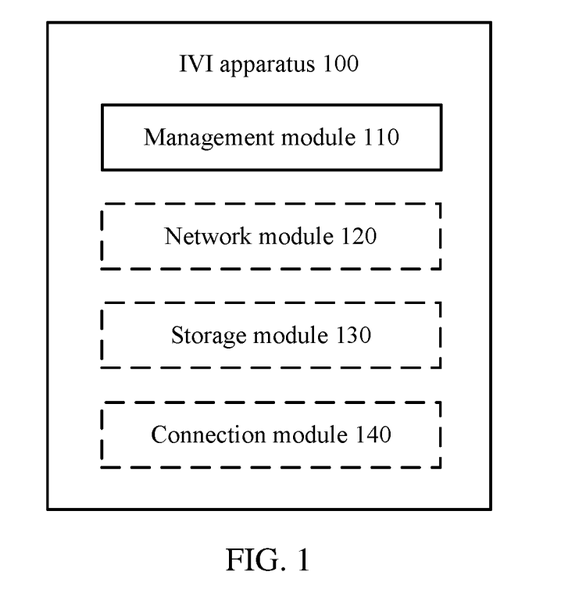
FIG. 1 is a schematic block diagram of an IVI apparatus according to an embodiment.

FIG. 1 is a schematic diagram of an IVI apparatus 100 according to an embodiment. As shown in FIG. 1, the IVI apparatus 100 includes a management module 110.

The management module 110 is configured to: obtain component information of each of at least one IVI component, where the component information includes a network address; and send the component information of each component to the terminal device, so that the terminal device communicates with the at least one IVI component based on the information about each IVI component.

Optionally, the management module may be a function module or an independent apparatus. This embodiment imposes no limitation thereto.

It can be understood that communication between the terminal device and each IVI component in this embodiment is based on a network.

Optionally, the IVI apparatus 100 may further include a network module 120. The network module 120 is configured to provide a first network for the terminal device and each IVI component. The network module 120 may be, for example, a switch or a wireless access point (AP).

Optionally, the first network may be a wired network (for example, an Ethernet network) or a wireless network. This embodiment imposes no limitation thereto.

Optionally, the network address may be an internet protocol (IP) address, a media access control (MAC) address, or the like, and is used to indicate an address of each IVI component in the first network. This embodiment imposes no limitation thereto.

It can be understood that, because the terminal device and each IVI component are connected to the first network, the terminal device and each IVI component need to be compatible with a communication protocol of the first network.

In an optional embodiment, all IVI components that access the first network may be flexibly configured in the first network through registration with the management module, and are controlled and managed by the management module. Correspondingly, the management module may scan the IVI components in the first network and perform authentication on the IVI components in the first network, and obtain component information of each of the at least one authenticated IVI component.

Optionally, that the management module performs authentication on the IVI components in the first network may include: authenticating whether a specific IVI component has permission to access the first network; or authenticating whether a specific IVI component has permission to establish a connection to a specific application module of the terminal device.

For example, if a low-security free game is defined by a user as an application that has no permission to use a camera in a vehicle or that has no permission to use an onboard diagnostics (OBD) component, the management module 110 may record permission information in a permission matrix of the management module 110. In this case, the management module 110 may perform security control on access behavior of an application module based on the permission information.

In another optional embodiment, a user may send a service request to the management module by using an application module on the terminal device, and the service request is used to request to provide a service for the application module. Correspondingly, the management module may receive the service request sent by the terminal device; determine, based on the service request, the at least one IVI component that has an association relationship with the application module; and obtain the component information of each of the at least one IVI component.

Optionally, the application module of the terminal device may communicate with the management module of the IVI apparatus by using a communications interface, and the communications interface may be, for example, client management software (client software installed on the terminal device or server software installed on the IVI apparatus). This embodiment imposes no limitation thereto.

It can be understood that the IVI component that has an association relationship with the application module of the terminal device may be an IVI component that can be invoked by the application module (or that is compatible with the terminal device).

It can be further understood that the application module of the terminal device may be a function module in the terminal device, for example, may be an application program installed on the terminal device.

Optionally, the IVI component in this embodiment may be a hardware device, in a vehicle, that may be invoked by the terminal device to implement a corresponding IVI service (for example, a multimedia playing service, a navigation service, a voice conversation service, or a vehicle internal and external environment monitoring service). The IVI component may be, for example, a display, a camera, an acoustic equipment, a man-machine operation panel, OBD, an atmosphere lamp, or a global positioning system (GPS). This embodiment imposes no limitation thereto.

For example, music playing software can control the acoustic equipment to play music for the user.

For another example, navigation software can control the acoustic equipment, the display, a GPS component, and the like to perform navigation for the user.

For another example, driving environment setting software can control a seat, a steering wheel, a rear-view mirror, an air conditioner, and the like to provide a service for the user. The driving environment setting software may set driving habit information of the user, and automatically adjust a corresponding operator cabin environment parameter based on the driving habit information, such as a seat height, a seat distance, a steering wheel angle, a rear-view mirror angle, and an air conditioner temperature. Optionally, the driving environment parameter may be set under protection of a security policy, and may be set only before driving. Once driving starts, a driving environment attribute cannot be automatically adjusted.

For another example, driving record software can control cameras in all directions outside a vehicle to stitch 360-degree images around the vehicle.

For another example, vehicle lock software can control on/off of a vehicle lock.

For another example, when a vehicle fails to travel due to a serious fault, monitoring software may obtain, with consent of the user, a current location by using the GPS, and submit a road field assistance request to a road traffic department.

For another example, the monitoring software can alternatively control a main driving camera to collect a facial image of the user; and may identify driving permission of the user and perform authentication on the driving permission of the user, by analyzing a facial feature of the user. For example, the monitoring software identifies whether the user has permission to use the vehicle, and even may identify a fugitive criminal through public security networking. The monitoring software may determine, by analyzing the facial feature of the user, whether the user is in fatigue driving, and may control a horn to alert the user.

Optionally, the IVI component may include a man-machine interaction panel. The user operates the terminal device by operating the man-machine interaction panel, to control another IVI component by using the terminal device. This embodiment imposes no limitation thereto. For example, the operation panel includes at least one key (knob), and the user may operate the terminal device by operating the key (knob).

Optionally, the terminal device in this embodiment may be a device having a wireless communication function and a computing function, and the terminal device may be, for example, a mobile phone, a tablet computer, or a notebook computer of the user. This embodiment imposes no limitation thereto.

Optionally, the component information may include the network address and other information. The other information may include at least one of a deployment location, a supported protocol (for example, the SNMP, the DLNA, or the RTSP), a protocol version, hardware information (for example, a device model, a hardware version, or a firmware version), and security information (for example, a permission level, a permission matrix, or a supported encryption manner). This embodiment imposes no limitation thereto.

In an optional embodiment, when the component information includes the network address, the terminal device may access each IVI component based on the network address of each IVI component, and obtain other information about each component from each IVI component. In this way, complexity of the management module and a hardware/computing capability requirement are relatively low.

In another optional embodiment, the component information includes the network address and the other information, and the terminal device does not need to repeatedly obtain the other information from the IVI component. In this way, signaling interaction between the terminal device and the IVI component can be reduced.

Optionally, the IVI apparatus 100 may further include a storage module 130. The storage module 130 is configured to store the component information obtained by the management module, and the storage module may be, for example, a memory.

The IVI apparatus provided in this embodiment obtains the network address of each of the at least one IVI component in the vehicle, and sends the network address of each IVI component to the terminal device, so that the terminal device can communicate with the at least one IVI component based on the network address of each IVI component, in other words, the user can control the IVI component by using the terminal device, to provide an IVI service for the user, thereby improving IVI service flexibility.

Application software commonly used by the user is installed on the terminal device of the user, and personalized IVI data, such as personal information and a multimedia resource, of the user is stored on the terminal device. Therefore, the user invokes an IVI component in the vehicle by using the application software on the terminal device, to provide an IVI service for the user, so that the IVI service flexibility can be improved.

In addition, the user can conveniently update the application program on the terminal device and the stored IVI data based on a requirement of the user, thereby improving user experience. In addition, because most protocol standards of the IVI apparatus are open standards, an application developer and an IVI component vendor may perform free adaptation, and openness is relatively strong.

Optionally, the IVI apparatus 100 may further include a connection module 140. When the terminal device is physically connected to the connection module 140, the connection module 140 is configured to establish a connection between the terminal device and the first network.

Optionally, the physical connection may be understood as contact with a surface of the connection module, adsorption on a surface of the connection module, or the like. This embodiment imposes no limitation thereto.

Optionally, the connection module may detect adsorption of the terminal device in manners such as an electromagnetic induction manner or an acoustic/optical/electromechanical manner. This embodiment imposes no limitation thereto.

Optionally, the connection module may establish the connection between the terminal device and the first network through induction, for example, through near field communication (NFC).

In an optional embodiment, the connection module may include a first induction coil. The first induction coil is used by the terminal device and the first network to perform NFC communication. For example, the induction coil is used by the terminal device and the first network to perform handshaking so that the management module in the first network can identify the terminal device and perform authentication on the terminal device. This embodiment imposes no limitation thereto.

Optionally, the connection module 140 is further configured to charge the terminal device.

In an optional embodiment, the connection module may include a second induction coil, and the connection module may charge the terminal device by using the second induction coil.

In another optional embodiment, the connection module may include a connection contact, and the connection module may charge the terminal device by using the second induction coil. A connection contact that matches the connection contact on the connection module needs to be configured on the terminal device.

Optionally, the first induction coil and the second induction coil may be a same induction coil. For example, the connection module reuses the first induction coil to establish the connection between the terminal device and the first network and charge the terminal device. This embodiment imposes no limitation thereto.

Optionally, the IVI apparatus may further include a battery management module. The battery management module is configured to: detect battery usage (for example, remaining power, a total quantity of charging times, a battery temperature, a charging current, or a battery lifespan) of the terminal device; and control, based on the battery usage, the connection module to charge the terminal device.

In an optional embodiment, the battery management module may determine, based on a case in which remaining battery power of the terminal device is less than a first preset threshold that the terminal device needs to be charged.

Optionally, the battery management module may be integrated into the connection module, or may be independent of the connection module. This embodiment imposes no limitation thereto.

Optionally, the connection module may include a heat dissipation component, and the connection module dissipates heat for the terminal device by using the heat dissipation component.

Optionally, the heat dissipation component may include an apparatus for heat dissipation, such as a cooling fan or a refrigerator. This embodiment imposes no limitation thereto.

Optionally, the IVI apparatus may further include a temperature management module. The temperature management module is configured to: detect an operating status (for example, a temperature, humidity, heat dissipation intensity, or dew point control) of the terminal device; and control, based on the operating status, the connection module to dissipate heat for the terminal device.

In an optional embodiment, the temperature management module may determine, based on a case in which a battery temperature of the terminal device is greater than a second preset threshold, that heat needs to be dissipated for the terminal device.

Optionally, the temperature management module may be integrated into the connection module, or may be independent of the connection module. This embodiment imposes no limitation thereto.

Optionally, the connection module may be fastened on the vehicle through mounting, for example, may be mounted on the steering wheel or an air exhaust vent of the air conditioner; or may be built into a body of the vehicle. This embodiment imposes no limitation thereto.

Optionally, after driving ends, the user may remove the terminal device from the connection module, in other words, disconnect the terminal device from the first network device, and an IVI service ends.

Optionally, after the IVI service ends, the management module may send a recovery signal to each of the at least one IVI component. Correspondingly, each component may receive the recovery signal, and restore to an initial state based on the recovery signal.

According to the IVI apparatus provided in this embodiment when the terminal device is physically connected to the connection module, the terminal device may access the first network, and communicate with the IVI component in the first network. Correspondingly, when the terminal device is separated from the connection module, the terminal device may be disconnected from the first network. In this way, convenience and flexibility of a user operation can be improved.

In addition, the physical connection between the terminal device and the connection module can be further used to: charge the terminal device, to improve an endurance capability of the terminal device; and dissipate heat for the terminal device, to optimize performance of the terminal device.

Optionally, the IVI apparatus 100 may be an apparatus independent of the vehicle, or may be integrated into a body of the vehicle. This embodiment imposes no limitation thereto.

Figure 2:
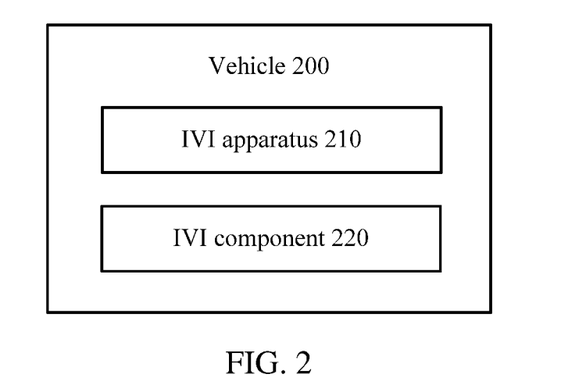
FIG. 2 is a schematic block diagram of a vehicle according to an embodiment.

FIG. 2 is a schematic block diagram of a vehicle 200 according to an embodiment. The vehicle 200 may include an IVI apparatus 210 and at least one IVI component 220. The IVI apparatus 210 may be the IVI apparatus 100 shown in FIG. 1. To avoid repetition, details are not described herein again.

Figure 3:
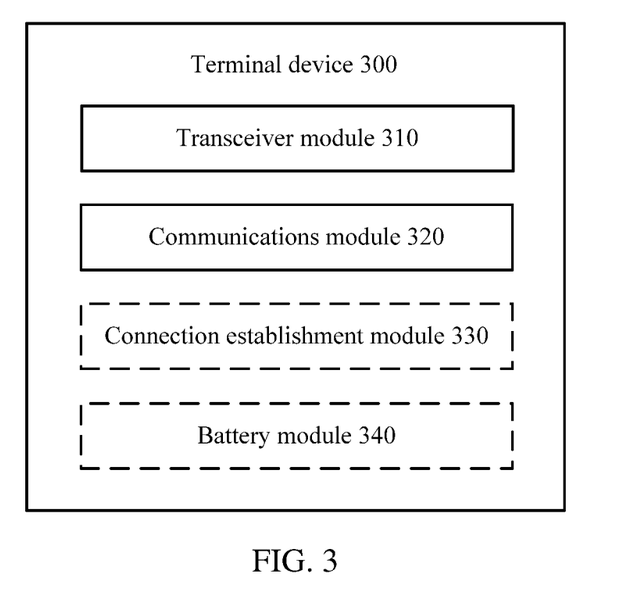
FIG. 3 is a schematic block diagram of a terminal device according to an embodiment.

FIG. 3 is a schematic block diagram of a terminal device 300 according to an embodiment. As shown in FIG. 3, the terminal device 300 includes a transceiver module 310 and a communications module 320.

The transceiver module 310 is configured to receive component information that is of each of at least one IVI component and that is sent by a management module of an IVI apparatus, where the component information includes an internet protocol address.

The communications module 320 is configured to communicate with the at least one IVI component based on the component information of each IVI component.

Optionally, the transceiver module may send a service request to the management module before receiving the component information that is of each IVI component and that is sent by the management module. The service request is used to request IVI information of an IVI component that provides a service for an application module of the terminal device. The terminal device may receive the component information that is of each of the at least one IVI component and that is sent by the IVI apparatus based on the service request.

Optionally, the communications module may perform receiving by using a communications interface.

Optionally, the communications module may communicate, based on the component information of each IVI component, with an IVI component that is in the at least one IVI component and that has an association relationship with the application module of the terminal device.

It can be understood that the application module of the terminal device may be a function module. For example, the application module may be an application program installed on the terminal device. The terminal device may include at least one application module.

It can be further understood that the IVI component that has an association relationship with the application module of the terminal device may be an IVI component that can be invoked by the application module (or that is compatible with the terminal device).

Optionally, the component information may include a network address and other information. The other information may include at least one of a deployment location, a supported protocol, a protocol version, hardware information, and security information. This embodiment imposes no limitation thereto.

In an optional embodiment, when the component information includes the network address, the terminal device may access each IVI component based on the network address of each IVI component, and obtain other information about each component from each IVI component. In this way, complexity of the management module and a hardware/computing capability requirement are relatively low.

In another optional embodiment, the component information includes the network address and the other information, and the terminal device does not need to repeatedly obtain the other information from the IVI component. In this way, signaling interaction between the terminal device and the IVI component can be reduced.

It can be understood that the application module of the terminal device may be a function module integrated into a mobile terminal, for example, may be an application program installed on the terminal device.

For example, it is assumed that the terminal device may receive an IVI component list sent by the management module, and the IVI component list includes network addresses and deployment locations (left front, right front, left rear, and right rear) of four acoustic pieces of equipment in the first network. The terminal device may communicate with any one or more of the four acoustic equipments based on component information of the four acoustic equipments. For example, the terminal device can schedule, based on a user requirement by using audio playing software, an acoustic equipment to play music.

Optionally, the terminal device may further include a connection establishment module 330. The connection establishment module 330 is configured to: before the terminal device sends the service request to the management module, establish a connection to the first network by using a connection module of the IVI apparatus.

Optionally, the terminal device may further include a battery module 340. The battery module 340 is configured to: supply power to the terminal device, and perform charging by using the connection module of the IVI apparatus. The battery module may include, for example, a power supply circuit and a charging circuit.

Optionally, the terminal device may further include a battery management module. The battery management module is configured to: detect battery usage (for example, remaining power, a total quantity of charging times, a battery temperature, a charging current, or a battery lifespan) of a mobile terminal; and control, based on the battery usage, the connection module of the IVI apparatus to charge the terminal device.

Optionally, the terminal device may further include a temperature management module. The temperature management module is configured to: detect an operating status (for example, a temperature, humidity, heat dissipation intensity, or dew point control) of the terminal device; and control, based on the operating status, the connection module of the IVI apparatus to dissipate heat for the terminal device.

It can be understood that the connection module may be the connection module described in FIG. 1. To avoid repetition, details are not described herein again.

The IVI apparatus, the vehicle, and the terminal device provided in the embodiments are described above in detail with reference to FIG. 1 to FIG. 3. A communication method provided in an embodiment is described below with reference to FIG. 4.

Figure 4:
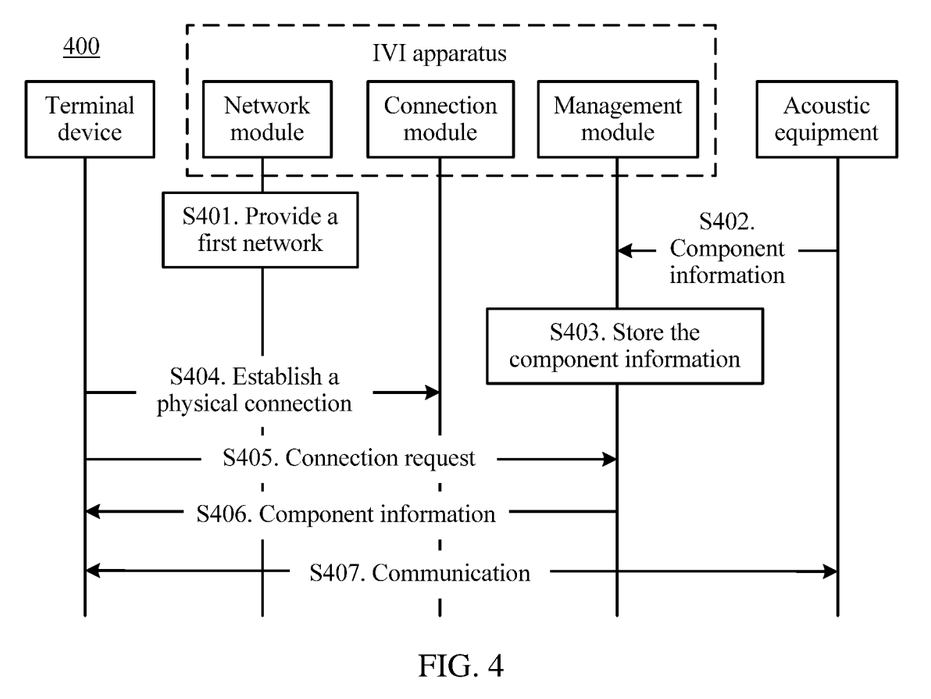
FIG. 4 is a schematic flowchart of a communication method according to an embodiment.

FIG. 4 is a schematic flowchart of a communication method 400 according to an embodiment.

In step S401, a network module of an IVI apparatus provides a first network.

Optionally, the first network may be a wired network or a wireless network.

In step S402, an acoustic equipment in the vehicle is connected to the first network, registers with a management module of the IVI apparatus, and publishes component information of the acoustic equipment to the management module. Correspondingly, the management module obtains the component information of the acoustic equipment.

It can be understood that an acoustic equipment is merely used as an example to describe this embodiment. The first network may further include another IVI component. However, this embodiment imposes no limitation thereto.

Optionally, the component information may include a network address and other information. The other information may include at least one of a deployment location, a supported protocol, a protocol version, hardware information, and security information. This embodiment imposes no limitation thereto.

In step S403, the management module stores the component information of the acoustic equipment.

Optionally, the management module may store the component information of the acoustic equipment into a storage module.

Optionally, the storage module may be an independent memory, or may be integrated into the IVI apparatus, the vehicle, or a terminal device. This embodiment imposes no limitation thereto.

In step S404, the terminal device establishes a physical connection to a connection module of the IVI apparatus.

Optionally, the connection module may be an independent apparatus. That a terminal device establishes a physical connection to a connection module of the IVI apparatus may be: A user places the terminal device on an upper surface of the connection module.

In step S405, the terminal device sends a connection request to the management module, where the connection request is used to request to provide a service for a music player of the terminal device. Correspondingly, the management module receives the connection request sent by the terminal device.

In step S406, the management module sends the component information of the acoustic equipment to the terminal device based on the connection request. Correspondingly, the terminal device receives the component information of the acoustic equipment that is sent by the management module.

In step S407, the terminal device communicates with the acoustic equipment based on the component information of the acoustic equipment, for example, to control the acoustic equipment to play music.

Optionally, in a driving process of the user, a battery management module of the IVI apparatus may obtain information about remaining battery power of the terminal device. When the remaining battery power is less than a first preset threshold, the battery management module may control the IVI apparatus to charge the terminal device.

Optionally, in a driving process of the user, a temperature management module of the IVI apparatus may obtain information about an operating temperature of the terminal device. When the operating temperature of the terminal device is greater than a second preset threshold, the temperature management module may control the IVI apparatus to dissipate heat for the terminal device.

Optionally, after driving ends, the user may remove the terminal device from the connection module, in other words, disconnect the terminal device from the first network device, and an IVI service ends.

Optionally, the management module may send a recovery signal to the acoustic equipment. Correspondingly, the acoustic equipment receives the recovery signal, and restores to an initial state based on the recovery signal.

According to the IVI apparatus provided in this embodiment, when the user physically connects a mobile terminal and the connection module after getting on the vehicle, functions such as establishing a connection to the first network, charging, heat dissipation, and performing wireless communication with an IVI component in the first network may be completed. Correspondingly, when the mobile terminal is separated from the connection module, the terminal device may be disconnected from the first network, and the IVI component in the vehicle restores to an initial state. In this way, convenience and flexibility of a user operation can be improved. The connection module charges the terminal device and dissipates heat for the terminal device, to improve an endurance capability of the terminal device and optimize an operating environment of the terminal device, thereby improving user experience.

In addition, with popularization of shared vehicles, users who use vehicles are relatively mobile, and the users have different habits and preferences. Because a terminal device of the user is more consistent with a usual usage habit and preference, better user experience can be brought for the user by using the IVI apparatus provided in this application.

A person of ordinary skill in the art may understand that the units and algorithm steps in the examples described with reference to the embodiments be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, but it should not be considered that the implementation goes beyond the scope of these embodiments.

It may be clearly understood by a person of ordinary skill in the art that, for the purpose of convenient and brief description, for a detailed working process of the described system, apparatus, and unit, refer to a corresponding process in the method embodiment. Details are not described herein again.

In the several embodiments provided in this application, it can be understood that the disclosed system, apparatus, and method may be implemented in other manners. For example, the described apparatus embodiment is merely an example. For example, the unit division is merely logical function division, and there may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely exemplary implementations, and are not intended to limit the protection scope. Any variation or replacement readily figured out by a person of ordinary skill in the art within the technical scope disclosed herein shall fall within the protection scope.

What is claimed is:

1. An in-vehicle infotainment (IVI) apparatus, comprising:
   a processor configured to obtain component information of each of at least one IVI component, wherein the component information comprises a network address;
   a transceiver configured to send the component information of each IVI component to a terminal device; and
   a connection module comprising an induction coil configured to establish a connection between the terminal device and a first network before the transceiver sends the component information of each component to the terminal device, wherein each IVI component is connected to the first network, and a heat dissipation component configured to dissipate heat for the terminal device.

2. The IVI apparatus according to claim 1, wherein the processor is further configured to:
   before obtaining the component information of each of the at least one IVI component, receive a service request sent by the terminal device, wherein the service request is used to request to provide a service for an application installed in the terminal device; and
   determine, in all IVI components based on the service request, the at least one IVI component associated with the application module.

3. The IVI apparatus according to claim 1, wherein the induction coil is further configured to charge the terminal device when detecting that the terminal device connects to the connection module.

4. The IVI apparatus according to claim 3, further comprising:
   a battery management module, configured to obtain battery usage of the terminal device before the terminal device is charged and determine, based on the battery usage, that the terminal device needs to be charged.

5. The IVI apparatus according to claim 1, further comprising:
   a temperature management module configured to obtain an operating status of the terminal device before heat is dissipated for the terminal device, wherein the operating status comprises a battery temperature, and determine, based on the operating status, that heat needs to be dissipated for the terminal device.

6. The IVI apparatus according to claim 1, further comprising:
   a network module configured to provide the first network for the terminal device and each IVI component before the management module obtains the component information of each IVI component.

7. The IVI apparatus according to claim 1, wherein the component information further comprises at least one of a deployment location, a supported protocol, a protocol version, hardware information, and security information.

8. The IVI apparatus according to claim 1, further comprising:
   a storage device configured to store the component information of each IVI component.

9. A terminal device, comprising:
   a transceiver configured to receive component information that is of each of at least one in-vehicle infotainment (IVI) component and that is sent by an IVI apparatus, wherein the component information comprises a network protocol address;
   a communications module configured to communicate with the at least one IVI component based on the network protocol address; and
   a connection module comprising an induction coil configured to establish a connection between the terminal device and a first network before the transceiver sends the component information of each component to the terminal device, wherein each IVI component is connected to the first network, and a heat dissipation component configured to dissipate heat for the terminal device.

10. The terminal device according to claim 9, wherein the transceiver is further configured to send a service request to the IVI apparatus before receiving the component information that is of each of the at least one IVI component, wherein the service request is used to request to provide a service for an application installed in the terminal device, and receive the component information that is of each IVI component based on the service request.

11. The terminal device according to claim 9, further comprising:
    a battery configured to supply power to the terminal device and charge the terminal device by using the connection module of the IVI apparatus.

12. The terminal device according to claim 9, wherein the communications module is further configured to communicate with some or all of the at least one IVI component based on the component information of each IVI component.

13. The terminal device according to claim 9, wherein the component information further comprises at least one of a deployment location, a supported protocol, a protocol version, hardware information, and security information.

14. A vehicle, wherein the vehicle comprises the in-vehicle infotainment IVI apparatus according to claim 9.

* * * * *